United States Patent
Goudar

(10) Patent No.: US 7,693,921 B2
(45) Date of Patent: Apr. 6, 2010

(54) REDUCING COMPUTATIONAL COMPLEXITY IN DETERMINING THE DISTANCE FROM EACH OF A SET OF INPUT POINTS TO EACH OF A SET OF FIXED POINTS

(75) Inventor: Chanaveeragouda V Goudar, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 1258 days.

(21) Appl. No.: 11/161,843

(22) Filed: Aug. 18, 2005

(65) Prior Publication Data
US 2007/0043800 A1 Feb. 22, 2007

(51) Int. Cl.
*G06F 7/00* (2006.01)
(52) U.S. Cl. .................................................... 708/200
(58) Field of Classification Search .................. 708/200, 708/520, 607, 603
See application file for complete search history.

(56) References Cited

U.S. PATENT DOCUMENTS 3,816,722 A * 6/1974 Sakoe et al. ................. 708/424
4,972,490 A * 11/1990 Thomson ..................... 704/208
5,046,100 A * 9/1991 Thomson ..................... 704/214

OTHER PUBLICATIONS

"Selectable Mode Vocoder (SMV) Service Option for Wideband Spread Spectrum Communication Systems" from 3D Generation Partnership Project 2, "3GPP2", 3GPP2 C.S0030-0, Version 3.0, Tables of contents—pp. 1-11 & pp. 126-130, Date: Jan. 2004, www.3gpp2.org.

* cited by examiner

*Primary Examiner*—Tan V Mai
(74) *Attorney, Agent, or Firm*—Steven A. Shaw; W. James Brady; Frederick J. Telecky, Jr.

(57) ABSTRACT

An aspect of the present invention takes advantage of the fact that the coordinates of fixed points do not change, and thus the energy (sum of squares of the coordinates defining the vector) of each fixed point is computed and stored. The energy of each variable input point may also be computed. The distance between each pair of fixed and input points is computed based on the respective energies and the dot product.

11 Claims, 3 Drawing Sheets

| RATE: | DESCRIPTION OF COMPUTATIONAL REQUIREMENT | TOTAL WFLOPS |
|---|---|---|
| RATE 1 | 30*(2+8*128+7*64+5*16) | 54240 |
| RATE 1/2 | 30*(2*128+9*128+7*64) | 55680 |
| RATE 1/4 | 30*(1*128+9*128+7*64) | 51840 |
| RATE 1/8 | 30*(1*16+16*16+16*8) | 12000 |

| RATE: | TERM 1 COMPLEXITY (WFLOPS) | TERM 2 COMPLEXITY (WFLOPS) | TERM 3 COMPLEXITY (WFLOPS) | TOTAL WMSE COMPUTATION COMPLEXITY (WFLOPS) | PERCENTAGE REDUCTION CAMPARED STANDARD FLOATING POINT CODE |
|---|---|---|---|---|---|
| RATE 1 | 20*(2+8+7+5) | 20*(128+128+64+16) | 12*(2*128+8*128+7*64+5*16)+440 | 28936 | 45.98% |
| RATE 1/2 | 20*(2+9+7) | 20*(128+128+64) | 12*(2*128+9*128+7*64)+360 | 29392 | 47.21% |
| RATE 1/4 | 20*(1+9+7) | 20*(128+128+64) | 12*(1*128+9*128+7*64)+340 | 27816 | 46.34% |
| RATE 1/8 | 20*(1+16+16) | 20*(16+16+8) | 12*(1*16+16*16+16*8)+660 | 6920 | 42.33% |

REDUCING COMPUTATIONAL COMPLEXITY IN DETERMINING THE DISTANCE FROM EACH OF A SET OF INPUT POINTS TO EACH OF A SET OF FIXED POINTS

BACKGROUND OF THE INVENTION

1. Field of the Invention

The present invention generally relates to a computer implemented approach to determine the distance from each of set of input points to each of a set of fixed points, and more specifically to the use of such approaches to speech encoding.

2. Related Art

There is often a need to determine the distance from each of a set of input points to each of a set of fixed points. For example, in data compression techniques (e.g., speech encoding), the nearest code words (fixed points) corresponding to parameters ("speech parameters") characterizing speech samples are often determined. The nearest code words may then be deemed to represent one or more of the speech samples. Examples of such approaches are described in the 3GPP2 C.S0030_0 standard, Version 3.0, Dated January 2004, entitled, "Selectable Mode Vocoder (SMV) Service Option for Wideband Spread Spectrum Communication Systems".

The distance between two points (in a n-dimensional space) a and b, having coordinates of (a1, a2, ... an) and (b1, b2, ... , bn) may be computed using Euclidean approach according to Equation (1) below:

$$\text{Distance}(a, b) = \sqrt{\sum_{j=1}^{n}(aj-bj)^2} \quad \text{Equation 1}$$

$$\sqrt{\text{Energy}(a) + \text{energy}(b) - \text{DotProductsum}(a, b)} \quad \text{Equation (3)}$$

In one approach, assuming that there are R fixed points and L input points (wherein L and R are integers), Equation (1) is used (L*R) times. For each distance between a pair of points, the number of computations equal n subtractions, n square operations, (n−1) additions, and one square root operation.

Thus, for illustration, assuming R=30, L=7, n=10, the number of computations equals {(30*7) (10 subtractions, 10 square operations, 9 additions, and 1 square root)}. That is, 2100 square operations, 2100 subtractions, 1890 additions and 210 square root operations, may be performed in total. Alternatively, only the square of the distance may suffice in some embodiments and the 210 square root operations may be avoided in such embodiments.

There is a general need to reduce the computational complexity while determining such distances.

BRIEF DESCRIPTION OF THE DRAWINGS

Various features of the present invention will be described with reference to the following accompanying drawings.

FIG. 6 is a block diagram illustrating an example device in which various features of the present invention are operative by execution of corresponding software instructions.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention takes advantage of the fact that the coordinates of fixed points do not change, and thus the energy (sum of squares of the coordinates defining the vector) of each vector is computed and stored. The stored value is then used to determine the distance according to the following equation:

$$\text{Distance}(a, b) = \sqrt{\sum_{j=1}^{n} aj^2 + \sum_{j=1}^{n} bj^2 - \sum_{j=1}^{n}(2 \times aj \times bj)} \quad \text{Equation (2)}$$

wherein a represents an input vector/point and b represents a fixed vector (or point), aj represents the jth coordinate of vector a, and bj represents the jth coordinate of vector b.

Thus, the energy of each fixed vector can be computed only once irrespective of the number of input vectors (a). Similarly, the energy of each input vector can be computed only once irrespective of the number of fixed vectors. As a result, the computational complexity is reduced when determining the distance between from each of a set of input points/vectors to each of multiple fixed points.

According to another aspect of the present invention, the above noted approaches are extended to a scenario in which a weight is associated with the difference in each dimension (i.e., weight wk, is associated with $(ak-bk)^2$). Computational reduction is obtained in such a scenario as well. The reduction is illustrated to be applicable in compressing speech samples in the embodiments described below. It should be appreciated that when wk=1, the computations of this scenario reduce to Equations (2) and (3) noted above.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
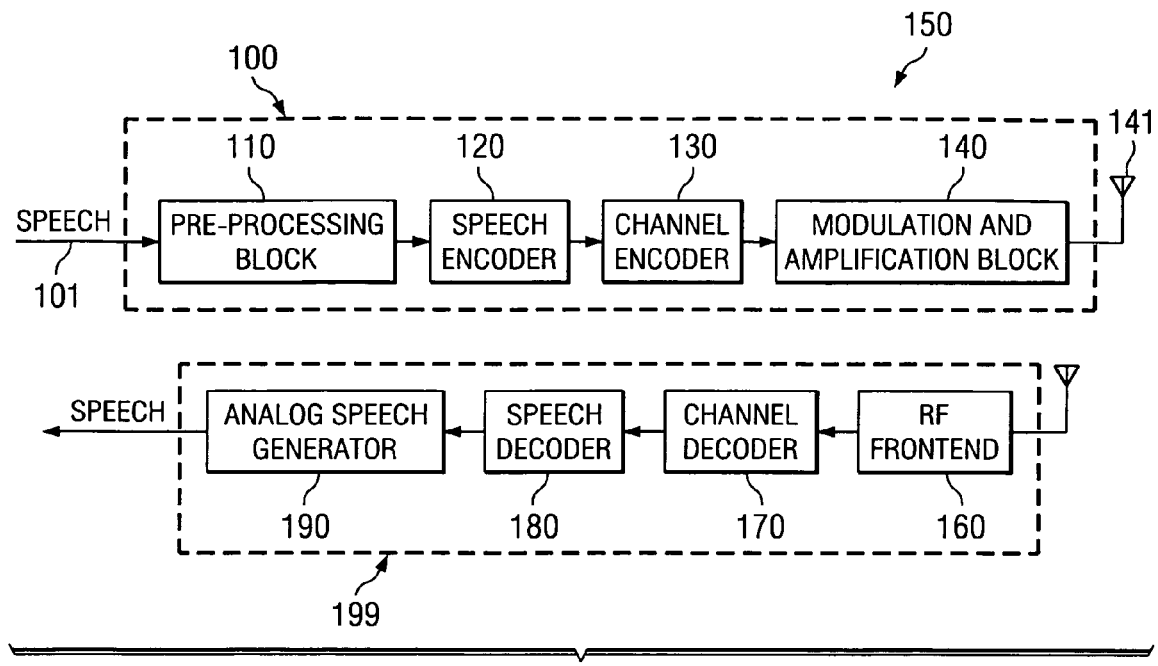
FIG. 1 is a block diagram containing the details of two mobile phones illustrating an example environment in which various aspects of the present invention can be implemented.

FIG. 1 is a block diagram illustrating the details of an example environment in which various aspects of the present invention can be implemented. The environment is shown containing mobile phones 100 and 199 connected by wireless network 150. Each block is described below in further detail.

Mobile phone 100 is assumed to encode speech signal received on path 101 in the form of compressed digital data, and transmit the resulting data bits to mobile phone 199. Mobile phone 199 reproduces the speech signal from the received digital bits. Mobile phones 100 and 199 represent example devices in which various aspects of the present invention can be implemented. Each mobile device is described below in further detail.

Mobile phone 100 is shown containing pre-processing block 110, speech encoder 120, channel encoder 130, and modulation and amplification block 140, and mobile phone 199 is shown containing RF front-end 160, channel decoder 170, speech decoder 180, and analog speech generator 190. Each component is described below in further detail.

For conciseness, mobile phone 100 is described as transmitting compressed speech signal and mobile phone 199 as reproducing the speech signal. However, the speech transmission would typically occur in the reverse direction as well, and accordingly each device also contains the components depicted in the other device.

Pre-processing block 110 samples the input speech signal and performs various speech enhancements (e.g., silence enhancement, noise suppression, well known in the relevant arts) by processing the digital samples. The output (uncompressed digital codes) of such processing is provided to speech encoder 120.

Speech encoder 120 encodes the uncompressed digital codes in compressed format, and provides the compressed data to channel encoder 130. In an embodiment, the uncompressed digital codes are received at 128 Kbps, and the compressed data is generated at 8 Kbps. Some of the details of an example embodiment of speech encoder 120 are described in further detail in sections below.

Channel encoder 130 encodes the compressed data with various error control coding techniques (well known in the relevant arts) based on the characteristic of the channel over which the wireless communication is performed. Modulation and amplification block 140 modulates the encoded digital data using a carrier of frequency. The modulated signal is amplified and transmitted using antenna 141. The modulated signal may reach mobile phone 199 over wireless medium.

Continuing with the description of the components of mobile phone 199, RF front-end 160 receives the modulated signal and demodulates the received signal to obtain the encoded digital data. Channel decoder 170 extracts the compressed data (by performing any needed corrections according to the error control codes) from the encoded digital data. The extracted compressed data is provided to the speech decoder 180.

Speech decoder 180 decompresses the compressed speech signal and provides digital samples representing a speech signal to analog speech generator 190. Analog speech generator 190 converts the digital samples into speech signal and provides the analog speech signal to speaker (not shown) to reproduce the audible speech.

From the above, it may be appreciated that speech encoder 120 compresses the sampled digital codes and speech decoder 180 decompresses the data after recovery of the compressed codes. The two blocks may need to be implemented using consistent approaches, within acceptable quality and other design considerations.

The compression approaches may require determination of distance of each of multiple input points from several fixed points in a multi-dimensional space, as described below with respect to the details of speech encoder 120 in one embodiment.

3. Speech Encoder

Figure 2:
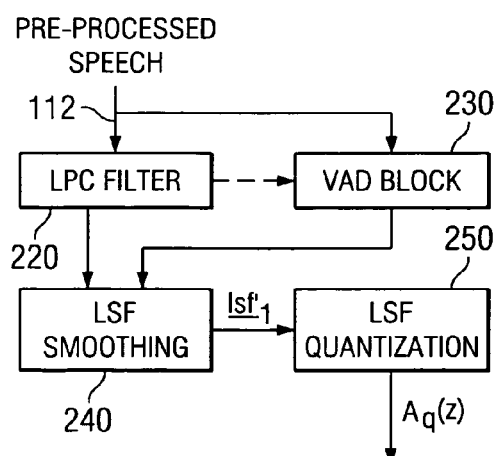
FIG. 2 is block diagram illustrating the details of a speech encoder in one embodiment.

FIG. 2 is a block diagram illustrating the relevant details of speech encoder 120 in one embodiment. Speech encoder 120 is shown containing LPC (linear predictive coding) filter 220, voice activity detection (VAD) block 230, LSF (line spectral frequencies) smoothing block 240, and LSF quantization block 250. The general concepts underlying each of these blocks are described in a standards document number 3GPP2 C.S0030_0, Version 3.0, noted above in the background section. However, the relevant details are described briefly below.

LPC filter 220 receives uncompressed digital codes representing the speech signal from pre-processing block 110 (on path 112), and estimates speech parameters representing attributes such as pitch, formants, spectra, etc., using previous speech samples. The estimated speech parameters (coefficients of the Nth order linear filter used for estimation) are provided as LSF parameters to LSF smoothing block 240.

VAD block 230 receives the speech parameters and classifies the input signal as either active voice (speech) or inactive voice (silence or background noise). VAD block 230 extracts several parameters from the input signal and makes the classification decision using a set of thresholds. The data representing the classification is provided to LSF smoothing block 240.

LSF smoothing block 240 smoothens the received LSF parameters by averaging the received values with previously received corresponding values. The smoothing operation is performed considering classification indication (voice, silence, no signal, etc.) received from VAD block 230. The smoothened parameters (forming a LSF vector) are provided to LSF quantization block 250.

LSF quantization block 250 receives the line spectral coefficients and generates a compressed representation of the line spectral coefficients. The compression may be performed by using a vector quantization technique, in which inputs vectors are approximated to corresponding closest fixed vectors, as described below in further detail.

4. Vector Quantization

The manner in which line spectral coefficients may be compressed is described with reference to the diagram of FIG. 3. Broadly, prediction blocks 310 and 320 are used to predict present LSF vectors (from several prior received LSF vectors) using respective different approaches. Errors representing the difference of the respective predicted and received LSF vectors are provided on paths 313 and 323 (in the form of vectors of the same order).

Stage 330 performs vector quantization of the received error vectors, in which a desired number of nearest fixed pre-specified vectors are determined. Broadly, a specified number of fixed pre-specified vectors which are closest to the received error vectors are determined, as illustrated with reference to FIG. 4.

Figures 4, 6A, 6B:
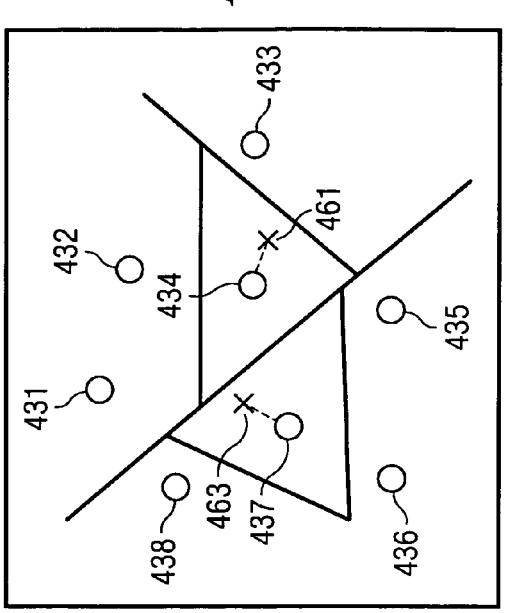
FIG. 4 illustrates the need for determining nearest distances while representing speech samples in compressed format in an embodiment.

With respect to FIG. 4, it is assumed that there are 8 fixed points/vectors (431-438), and 2 input points (461 and 463), and it is desirable to select 3 closest fixed points. Accordingly, 16 (8 multiplied by 2) distances are calculated corresponding to each pair of fixed vector-input point combination. The distances are sorted and the fixed points corresponding to the 3 minimum distances are selected.

In one embodiment, the (square of the weighted) distance between a lth input point (from a set of input points) and rth fixed point from a codebook (set of fixed point) is represented as a weighted mean square error (WMSE) values given as in the below Equation:

$$WMSE_{LSF}^{l,r} = \sum_{i=1}^{10} W_{LSF}(i)(I_{LSF}^l(i) - C_{LSF}^r(i))^2 \quad \text{Equation (4)}$$

$$WMSE_{LSF}^{l,r} = \sum_{i=1}^{10} W_{LSF}(i)(I_{LSF}^l(i) - C_{LSF}^r(i))^2 \quad \text{Equation (4)}$$

wherein I represents an input point, C represents a fixed points, i represents an index and WLSF represents a weight.

Figure 3:
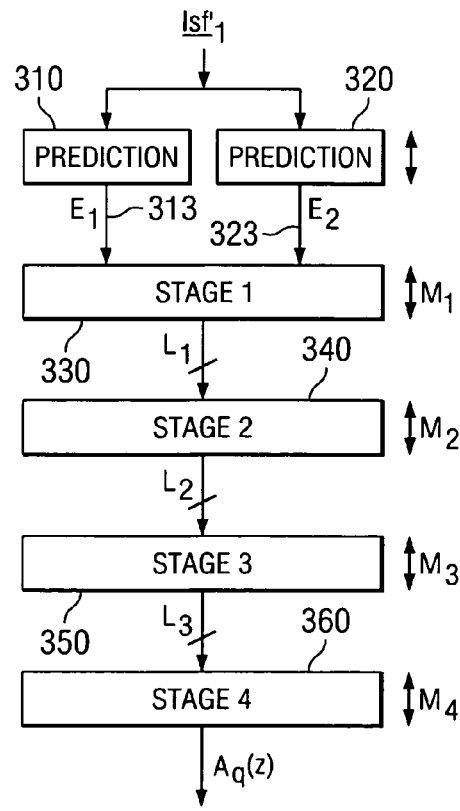
FIG. 3 is a block diagram illustrating the manner in which a speech samples is represented in compressed format in one embodiment.

Continuing with respect to FIG. 3, set of error vectors, each representing difference between selected input point and selected fixed point (selected based on lowest WMSE value) are provided to stage 340 for further quantisation. The quantization may be continued in a number of stages until a single vector is generated in the last stage (here stage 360).

Such use of multiple stages is generally referred to as a multi-stage vector quantization (MSVQ) technique in the relevant arts. In one embodiment, four stages are employed with 128, 128, 64, and 16 fixed points/vectors respectively, and the first three stages respectively select 8, 7 and 5 closest points. The first stage in that embodiment receive 1 or 2 inputs which are prediction error vectors from block 310 and/or 320 representing the input points, as shown.

The pre-specified vectors corresponding to each stage may be stored in a table (memory, not shown), and indices representing the respective (reference) positions of the closest selected vectors are sent to channel encoder 130. The table contents (i.e., the location of the fixed vectors) can also be dynamically varied (by speech encoder 120), and the table contents can also be sent according to pre-specified protocols. Dynamic changes to the table contents is often referred to as code-book training in the relevant arts. Speech decoder 180 decompresses the data based on the received indices and table contents in a known way.

From the above description, assuming that there are R fixed points and L input points (wherein L and R are integers), the weighted distances are used (L*R) times. Various features of the present invention reduces the computational complexity while determining such distances, as described below. First the manner in which an aspect of the present invention reduces the computational complexity when computing the distances from each of multiple input points from each of multiple fixed points, is described.

5. Determining Distances

Figure 5:
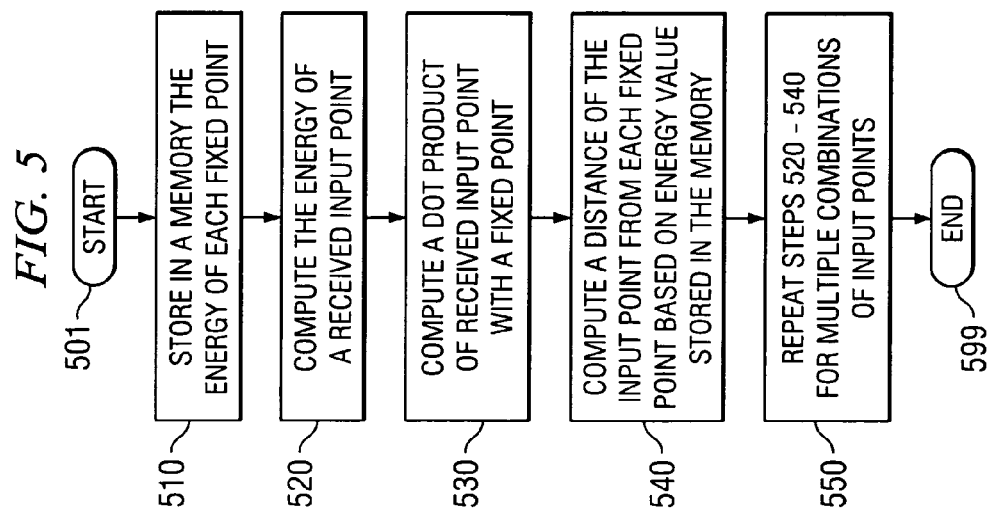
FIG. 5 is a flowchart illustrating the manner in which the distance between each of multiple fixed points and each of multiple input variable points can be determined in an embodiment of the present invention.

FIG. 5 is a flowchart illustrating the manner in which distances from each of multiple input points from each of multiple fixed points may be computed according to an aspect of the present invention. The flowchart is described with reference to FIGS. 1-4, and stage 330 in particular, merely for illustration. The approaches can however be used in several other environments and stages, as will be apparent to one skilled in the relevant arts by reading the disclosure provided herein. The flowchart starts in step 501, in which control transfers to step 510.

In step 510, stage 330 stores in a memory the energy (defined as the sum of the squares of the coordinates of the vector defining a point) of each fixed point. In an alternative embodiment, the square values of the individual coordinates are stored. However, computational complexity is reduced by storing the sum (energy), as can be readily appreciated. Other approaches can be used to store the square values, depending on various considerations.

In step 520, stage 330 computes the energy of each received input point, which may also be stored in a memory. The energy may be computed by squaring each coordinate of the input point, and adding the square values. As will be clear from the description below, steps 520, 530 and 540 would then be performed to determine each distance of interest.

In step 530, stage 330 computes a dot product of a received input point with a fixed point. The dot product is computed by multiplying corresponding coordinates of the input point and the fixed point, and adding the results. The necessary multiplication by 2 for each dot product may be eliminated by multiplying input vector by 2 and storing the scaled input vector. The dot product is hence computed by multiplying scaled input vector with the fixed point.

In step 540, stage 330 computes a distance of the input point from each fixed point based on energy values (or other data) stored in the memory.

In step 550, steps 520 through 540 noted above are performed for multiple combinations of input points and fixed points. Assuming the energy value for each input point is already stored (as noted in step 520), only steps 530 and 540 need to be performed for each combination of input points and fixed points. The flowchart ends in step 599.

It should be appreciated that the approach above determines the distances of desired combinations of points with reduced computational complexity. In comparison to the example noted in the background section in which there are 30 fixed points and 7 input points (wherein L and R are integers), the number of computations equals (300+70) square operations, (370) additions, 2100 multiply accumulate (MAC) operations.

Of the above, 300 square operations and 300 addition operations are performed in step 510, 70 square operations and 70 additions are performed in step 320, and 2100 MAC operations are performed in step 530. These number of computations compare favorably with the 2100 square operations, 2100 subtractions, 1890 additions and 210 square root operations noted above in the background section.

The description is continued with respect to the manner in which the above-noted approach can be applied to reduce computation complexity when determining distances of Equation 4 (in which weighted mean square error is being computed).

6. Weighted Mean Square Error

The approach of FIG. 5 can be used to determine weighted mean square error (WMSE) of equation 4. Hence according to an aspect of the present invention, the weighted mean square error between a Ith Input point and rth fixed point from a code-book may be computed as:

$$WMSE_{LSF}^{l,r} = \sum_{i=1}^{10} W_{LSF}(i)(I_{LSF}^l(i))^2 + \sum_{i=1}^{10} W_{LSF}(i)(C_{LSF}^r(i))^2 + \sum_{i=1}^{10} (-2 * W_{LSF}(i)I_{LSF}^l(i)) \cdot C_{LSF}^r(i) \quad \text{Eq. (5)}$$

wherein * and "." represents multiplication and dot product operations respectively and the remaining terms are defined above with respect to Equation (4). In the description below, the three terms (from left to right) separate by the two + symbols are referred to as a term 1, term 2 and term 3 respectively.

The reduction in computation complexity is illustrated using the tables of FIGS. 6A and 6B. Broadly, the table of FIG. 6A illustrates the computational complexity when the distances are computed according to the prior approach of Equation 4, while FIG. 6B illustrates the corresponding computational complexity when the distances are computed according to Equation (5).

The information in both the tables is provided assuming four stages are employed with corresponding number of fixed vectors (code book size) 128, 128, 64, and 16 respectively, and the number of input vectors to corresponding four stages equals 2, 8, 7 and 5.

With respect to FIG. 6A, row 610 corresponds to Rate 1 (Highest date rate, in the 3GPP2 standard) as indicates by column 620. The corresponding computation requirement (of the prior approach) is shown in column 621. Here 30 represents the sum of 10 subtraction, 10 square operations and 10 MAC (multiplication and accumulation) operations to be performed for each combination in Equation 4. The number of combinations i represented by (2*128+8*128+7*64+5*16), consistent with the code book size and the number of input vectors, noted above.

Column 622 indicates the total computational complexity measured in terms of WFLOPs (number of floating point operations), and is shown equaling 54,240 in row 622. The remaining rows 611, 612 and 613 are similarly described, and the corresponding description is not repeated in the interest of conciseness. The reduction of computational complexity is now described with respect to FIG. 6B.

With respect to FIG. 6B, it should be appreciated that rows 660-663 respectively correspond to the same rates as in row 610-613. Columns 671, 672, and 673 respectively correspond to the computations for term 1, term 2 and term 3 of Equation 5. For conciseness, only the values in row 660 are described is detail and compared with the corresponding values of row 610.

With respect to row 660, column 671 indicates that the computational complexity for term 1 equals (20*(2+8+7+5)), wherein 2, 8, 7 and 5 correspond to the number of input vectors in the four stages respectively, + and * representing the arithmetic addition and multiplication operations respectively. 20 corresponds to 10 square operations and 10 multiplication operations.

Column 672 of row 660 is shown containing (20*(128+128+64+16)) for the second term (term 2), wherein 20 is described above, and 128, 128, 64 and 16 respectively correspond to the code-book entries in the each of the four stages.

Column 673 of row 660 is shown containing (12*(2*128+8*128+7*64+5*16)+440) for term 3. In this, the first 12 corresponds to 10 MAC operations for dot product and 2 additions required to sum term 1 and term 2 with term 3. The number 440 corresponds to 20(2+8+7+5) operations, wherein 2, 8, 7 and 5 correspond to the number of input vectors in the four stages respectively and 20 corresponds to multiplication operation performed to multiply each input vector with a 2 and weight.

Column 674 of row 660 represents the aggregate computational complexity (28936) for the three terms in the four stages, and is thus obtained by adding the corresponding entries in the three columns 671-673.

Column 675 represents the total percentage of reduction in computational complexity. Row 660 indicates that the reduction in computational complexity for rate 1 equals 45.98% (=(54240−29296)*100/54240). Reduction in computational complexity is similarly shown obtained for rates ½, ¼ and ⅛ also.

Thus, the approach of FIG. 5 can be used to reduce the number of computations required in mobile phones 100 and 199 described above. The approaches can be used in other environments as well. The description is continued with respect to an embodiment in which the features are operative upon execution of software instructions, as described below.

7. Digital Processing System

Figure 7:
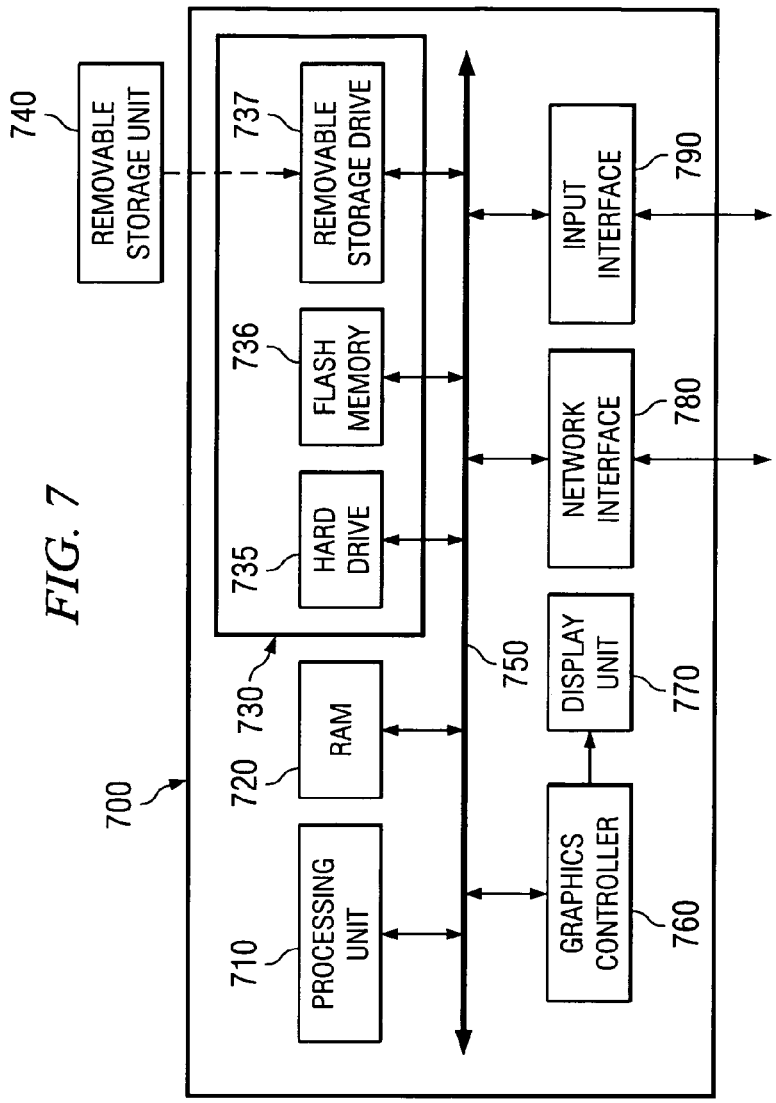
FIG. 7 is a block diagram of a computer system 700 illustrating an example system in which distances may be computed in accordance with embodiments of the invention.

FIG. 7 is a block diagram of computer system 700 illustrating an example system in which distances may be computed according to the approaches described above. Computer system 700 may contain one or more processors such as central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention (by performing tasks corresponding to various approaches described above). CPU 710 may contain multiple processing units, with each processing unit potentially being designed for a specific task. Alternatively, CPU 710 may contain only a single processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Input interface 790 may correspond to a key_board and/or mouse, and generally enables a user to provide inputs. Network interface 780 enables some of the inputs (and outputs) to be provided on a network.

Secondary memory 730 may contain hard drive 731, flash memory 736 and removable storage drive 737. Secondary storage 730 may store the software instructions (which perform the actions specified by various flow chart above) and data (e.g., the tables in case of phones), which enable computer system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD_ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. An embodiment of the present invention is implemented using software running (that is, executing) in computer system 700.

In this document, the term "computer program product" is used to generally refer to removable storage unit 740 or hard disk installed in hard drive 731. These computer program products are means for providing software to computer system 700. As noted above, CPU 710 may retrieve the software instructions, and execute the instructions to provide various features of the present invention.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for encoding in a speech encoder of said method comprising:
receiving a stream of uncompressed digital codes;
computing the distance between each of L input points and R fixed points, wherein L and R are integers having a value greater than 1, the with one of said input points being represented by (Iw1, Iw2, ..., Iwn) and jth one of said fixed points being represented by (Fj1, Fj2, ..., Fjn), said method computing comprising:
(a) computing the squares of the coordinates (Fj1, Fj2, ..., Fjn) of each of said R fixed points;
(b) computing the energy of a first input point, wherein the energy of a vector equals the sum of the squares of the coordinates (Iw1, Iw2, ..., Iwn) of the vector;
(c) computing a dot product sum of said first input point with a first fixed point, wherein said first input point and said first fixed point are contained in said L inputs points and said R fixed points respectively;
(d) computing a distance of said first input point with said first fixed point based on said data of (a), said dot product sum and said energy of said first input point computed in (b),
wherein (b)-(d) are repeated for multiple combinations of input points and fixed points combination;
and
encoding said uncompressed digital codes into a compressed format using the results of computing the distance between each of L input points and R fixed points.

2. The method of claim 1, wherein (a) further comprises generating a sum of the squares of said coordinates (Fj1, Fj2, ..., Fjn) of each of said R fixed points to generate R corresponding energies for said R fixed points.

3. The method of claim 2, wherein the sums corresponding to each of said R fixed points are stored in a memory and used in (d).

4. A computer readable medium carrying one or more sequences of instructions for causing a system to compute the distance between each of L input points and R fixed points, wherein L and R are integers having a value greater than 1, the with one of said input points being represented by (Iw1, Iw2, ..., Iwn) and jth one of said fixed points being represented by (Fj1, Fj2, ..., Fjn), wherein execution of said one or more sequences of instructions by one or more processors contained in said system causes said one or more processors for use in a speech encoder to perform the actions of:
(a) computing the squares of the coordinates (Fj1, Fj2, ..., Fjn) of each of said R fixed points;
(b) computing the energy of a first input point, wherein the energy of a vector equals the sum of the squares of the coordinates (Iw1, Iw2, ..., Iwn) of the vector;
(c) computing a dot product sum of said first input point with a first fixed point, wherein said first input point and said first fixed point are contained in said L inputs points and said R fixed points respectively;
(d) computing a distance of said first input point with said first fixed point based on said data of (a), said dot product sum and said energy of said first input point computed in (b),
wherein (b)-(d) are repeated for multiple combinations of input points and fixed points combination.

5. The computer readable medium of claim 4, wherein (a) further comprises generating a sum of the squares of said coordinates (Fj1, Fj2, ..., Fjn) of each of said R fixed points.

6. The computer readable medium of claim 5, wherein the sums corresponding to each of said R fixed points are stored in a memory and used in (d).

7. The computer readable medium of claim 6, wherein said L input points represent L samples of speech, and R fixed points represents a code book according to which said L samples are represented in a compressed format.

8. A device comprising:
a linear predictive coding (LPC) filter operable to:
(a) receive L input points and R fixed points, wherein L and R are integers having a value greater than 1, the with one of said input points being represented by (Iw1, Iw2, ..., Iwn) and jth one of said fixed points being represented by (Fj1, Fj2, ..., Fjn);
a line spectral frequencies (LSF) smoothing block operable to:
(b) compute the squares of the coordinates (Fj1, Fj2, ..., Fjn) of each of said R fixed points;
(c) compute the energy of a first input point, wherein the energy of a vector equals the sum of the squares of the coordinates (Iw1, Iw2, ..., Iwn) of the vector;
(d) compute a dot product sum of said first input point with a first fixed point, wherein said first input point and said first fixed point are contained in said L inputs points and said R fixed points respectively;
(e) compute a distance of said first input point with said first fixed point based on said data of (a), said dot product sum and said energy of said first input point computed in (b),
wherein (c)-(e) are repeated for multiple combinations of input points and fixed points combinations.

9. The device of claim 8, further comprising:
a pre-processing block converting an analog signal into a plurality of samples in digital form,
an encoder compressing said plurality of samples, said encoder generating said L input points based on each of said plurality of samples, wherein said distances are used to represent each sample in a compressed form according to one or more code books.

10. The device of claim 9, wherein said analog signal comprises a speech signal and said encoder compresses said plurality of samples according to 3GPP2 standard.

11. The device of claim 10, wherein said device is a mobile phone.

* * * * *